L. BOIRAULT.
AUTOMATIC COUPLING FOR CARS AND CARRIAGES.
APPLICATION FILED FEB. 7, 1906.
977,926.
Patented Dec. 6, 1910.
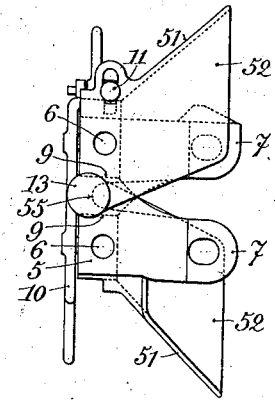
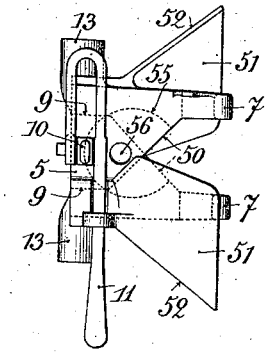
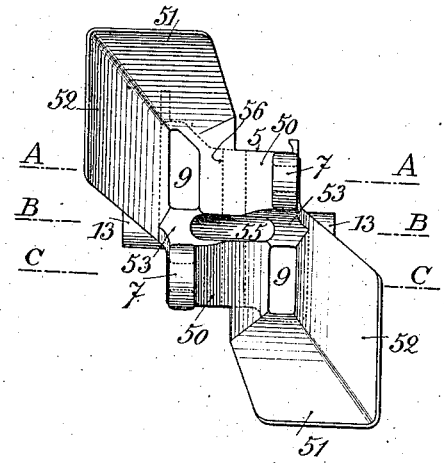
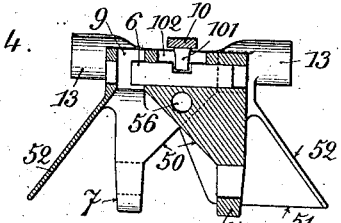
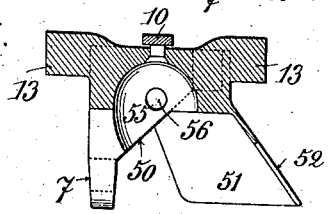
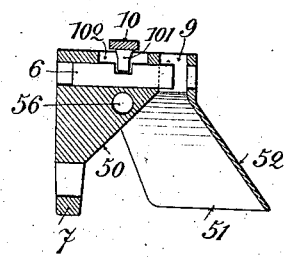
WITNESSES
J. P. Davis
C. E. Holske
INVENTOR
Louis Boirault
BY
ATTORNEYS

UNITED STATES PATENT OFFICE.

LOUIS BOIRAULT, OF PARIS, FRANCE, ASSIGNOR TO THE SOCIETE D'ETUDES DES BREVETS BOIRAULT, OF PARIS, FRANCE.

AUTOMATIC COUPLING FOR CARS AND CARRIAGES.

977,926.           Specification of Letters Patent.       Patented Dec. 6, 1910.

Application filed February 7, 1906. Serial No. 299,902.

*To all whom it may concern:*

Be it known that I, LOUIS BOIRAULT, a citizen of the Republic of France, residing at 8 Rue Emile Gilbert, Paris, in the Republic of France, engineer, have invented certain new and useful Improvements in Automatic Couplings for Cars and Carriages, of which the following is a specification.

The present invention relates to improvements in automatic couplings for cars, particularly of the kind made known by my prior American Patent No. 689,058, granted December 17, 1908. In the said couplings, each drawhead is provided with horns adapted to engage in openings of another head, with openings adapted to receive the horns of the other head, transversal bolts adapted to lock the said horns in the opening, and means for moving the said bolts. To cause the horns to enter the opposite or facing openings, on the two cars being brought together, it is necessary to provide the heads with guiding devices having planes properly inclined for correcting the lateral and vertical deflections of the heads. In the coupling referred to previously, such guiding devices consisted of a funnel added or attached to the side facing the head. Such devices were cumbersome and wanting in solidity.

The present invention has for its object to construct a coupling head of the hereinbefore specified type of such a special shape that the dimensions of the head including its guiding surfaces can be considerably reduced and that the solidity of the said parts can be considerably increased.

According to this invention, the front face of the head forms two funnels converging respectively to the two openings for horns arranged diagonally; the inner sides of the said funnels connect directly with the horns arranged diagonally in the other direction, and the outer sides of the funnels are constituted by wings which are integral with the head of the coupling. The said integral wings and head strengthens each other by reason of their integrality; furthermore, the employment of the guiding members other than the horns is avoided; lastly, the total width of the apparatus can be much less than in the coupling apparatus hereinbefore referred to for a same deflection of the coupling heads as provided for.

One embodiment of this invention is shown, by way of example, in the accompanying drawing, in which—

Figure 1 is a side elevation of a coupling head. Fig. 2 is a plan of the same. Fig. 3 is a front elevation, the lever 10, and pawl 11 not being shown. Figs. 4, 5 and 6 are horizontal sections on lines A—A, B—B and C—C respectively of Fig. 3.

The coupling head 5 comprises in a well known manner bolts 6, horns 7 pierced with openings to receive the bolts of another coupling, openings 9 to receive the horns of the said other coupling, the said horns 7 and openings 9 being arranged as a diagonal cross; a lever 10 swinging around a trunnion on the center of the head 5 and connected with the bolts 6 by trunnions 101, a catch-lever 11 adapted to retain the locking-bolt lever 10 in the position corresponding to the opening of the bolts. The trunnions 101 pass through the castings 102 in the rear face of the coupling head and are engaged in slots in the bolts. The trunnions 13 are formed on the sides of the coupling head. The coupling head is also provided with inclined planes designed to guide the horns of an opposite coupling head. For that purpose, the base of each horn, at its inner vertical side, is connected by an inclined plane 50 to the inner vertical edge of the openings 9, located at the same level; inclined lugs 51 and 52 extend forward and outward from the horizontal and vertical outer edges of the openings 9, and another inclined plane 53 connects the inner horizontal face of each horn to the inner horizontal edge of opening located in the same vertical line; the inclined parts 50, 51, 52, 53 thus form around each opening 9 a funnel arranged to engage with the corresponding horn of a similar coupling device placed opposite.

In order to allow of the device being coupled with cars provided with the system of coupling having a vertical pin passing through an eyelet in the end of the pull bar, a recess 55 is provided in the center of the head 5 to receive the end of such a pull bar, and a vertical hole 56 is made in the plate in front of the bolts to receive the vertical pin which serves to secure the said bar (neither the bar nor the pin being shown).

I claim—

In a coupling apparatus for cars, a coupling head having horns and openings arranged cross-wise, the edges of the said openings extending obliquely forward and forming, on the inner sides, inclined planes which extend to the bases of the horns, and on the outer sides, projecting lugs, the said lugs and inclined planes being adapted to guide the horns of another coupling apparatus up to and into the openings of the said coupling head, substantially as described.

In testimony, that I claim the foregoing as my invention, I have signed my name in presence of two subscribing witnesses.

LOUIS BOIRAULT.

Witnesses:
 HANSON C. COXE,
 MAURICE ROUX.